US012679132B2

(12) United States Patent
Hu et al.

(10) Patent No.: US 12,679,132 B2
(45) Date of Patent: Jul. 14, 2026

(54) OPTICAL ANTI-COUNTERFEITING ELEMENT AND MANUFACTURING METHOD THEREFOR, AND ANTI-COUNTERFEITING PRODUCT

(71) Applicants: ZHONGCHAO SPECIAL SECURITY TECHNOLOGY CO., LTD, Beijing (CN); CHINA BANKNOTE PRINTING AND MINTING CORP., Beijing (CN)

(72) Inventors: Chunhua Hu, Beijing (CN); Bao Zhang, Beijing (CN); Jun Zhu, Beijing (CN)

(73) Assignees: ZHONGCHAO SPECIAL SECURITY TECHNOLOGY CO., LTD., Beijing (CN); CHINA BANKNOTE PRINTING AND MINTING CORP., Beijing (CN)

( * ) Notice: Subject to any disclaimer, the term of this patent is extended or adjusted under 35 U.S.C. 154(b) by 511 days.

(21) Appl. No.: 18/252,601

(22) PCT Filed: Oct. 29, 2021

(86) PCT No.: PCT/CN2021/127489
§ 371 (c)(1),
(2) Date: May 11, 2023

(87) PCT Pub. No.: WO2022/100463
PCT Pub. Date: May 19, 2022

(65) Prior Publication Data
US 2024/0017562 A1 Jan. 18, 2024

(30) Foreign Application Priority Data
Nov. 11, 2020 (CN) .......................... 202011258235.2

(51) Int. Cl.
*B42D 25/328* (2014.01)
*B42D 25/455* (2014.01)
(Continued)

(52) U.S. Cl.
CPC ......... *B42D 25/328* (2014.10); *B42D 25/455* (2014.10); *B42D 25/46* (2014.10); *G02B 3/0037* (2013.01); *B42D 25/373* (2014.10)

(58) Field of Classification Search
CPC .... B42D 25/328; B42D 25/455; B42D 25/46; B42D 25/373; B42D 25/425;
(Continued)

(56) References Cited

U.S. PATENT DOCUMENTS

2018/0001692 A1 1/2018 Rich
2020/0031158 A1* 1/2020 Sun ........................... G02B 3/06

FOREIGN PATENT DOCUMENTS

CN 1423598 A 6/2003
CN 102975568 3/2013
(Continued)

*Primary Examiner* — James C. Jones
(74) *Attorney, Agent, or Firm* — Riverside Law LLP

(57) ABSTRACT

Disclosed are an optical anti-counterfeiting element and a manufacturing method thereof, and an anti-counterfeiting product. The optical anti-counterfeiting element includes a micro lens array layer and a micro graphic-text array layer; the micro graphic-text array layer includes a micro graphic-text area and a micro graphic-text background area; surface undulation shapes of the micro graphic-text area and the micro graphic-text background area are different; and/or a height difference is set for the micro graphic-text area and the micro graphic-text background area, so that a graphic-text area and/or a graphic-text background area imaged by the micro lens array layer and the micro graphic-text array layer under sampling synthesis have different visual features. In particular, with a change in an observation angle, a graphic-text and/or a graphic-text background changes from
(Continued)

one color to another color, thereby improving an anti-counterfeiting capability.

16 Claims, 2 Drawing Sheets

(51) Int. Cl.
    *B42D 25/46*         (2014.01)
    *G02B 3/00*         (2006.01)
    *B42D 25/373*     (2014.01)

(58) Field of Classification Search
    CPC .... B42D 25/324; B42D 25/351; B42D 25/30;
           B42D 25/40; B42D 25/45; G02B 3/0037
    See application file for complete search history.

(56)                 References Cited

FOREIGN PATENT DOCUMENTS

| | | |
|---|---|---|
| CN | 104647938 | 5/2015 |
| CN | 104656167 | 5/2015 |
| CN | 105479974 | 4/2016 |
| CN | 106338786 | 1/2017 |
| CN | 106808835 | 6/2017 |
| CN | 108367586 | 8/2018 |
| CN | 109070622 A | 12/2018 |
| CN | 109318618 | 2/2019 |
| EP | 3284612 A1 | 2/2018 |
| WO | 2016029692 | 3/2016 |

* cited by examiner

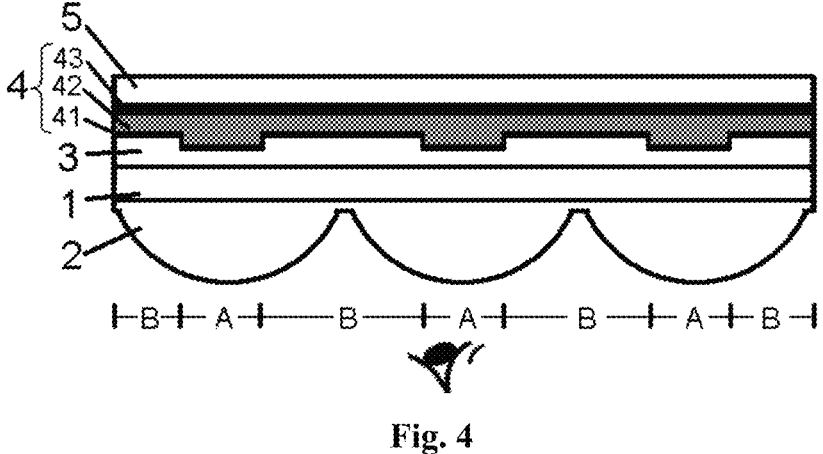

Fig. 4

Form a multi-layer body comprising a micro lens array layer
and a micro graphic-text array layer, wherein a surface
undulation shape of a micro graphic-text area and a surface
undulation shape of a micro graphic-text background area are
different; and/or a height of the micro graphic-text area and a
height of the micro graphic-text background area are different

S1

Form an absorption layer on the micro graphic-text array layer,
form a dielectric layer on the absorption layer by a wet coating
process, and form a reflecting layer on the dielectric layer

OPTICAL ANTI-COUNTERFEITING ELEMENT AND MANUFACTURING METHOD THEREFOR, AND ANTI-COUNTERFEITING PRODUCT

CROSS-REFERENCE TO RELATED APPLICATION

The disclosure is a National Stage Filing of the PCT International Application No: PCT/CN2021/127489 filed on 29 Oct. 2021, which claims priority to and the benefit of Chinese Patent Application No. 202011258235.2, filed to the China National Intellectual Property Administration (CHIPA) on 11 Nov. 2020, both of which are hereby incorporated by reference in their entirety.

TECHNICAL FIELD

The disclosure relates to various high-safety or high-added-value presswork such as banknotes, certificate cards and product packaging, and in particular to an optical anti-counterfeiting element and a manufacturing method thereof, and an anti-counterfeiting product with the anti-counterfeiting element.

BACKGROUND

In order to prevent counterfeiting caused by scanning, copying and other means, optical anti-counterfeiting elements such as safety lines, strips, or labels are widely used in various types of high-safety or high-added-value presswork such as banknotes, certificate cards and product packaging. Anti-counterfeiting technologies used by the optical anti-counterfeiting elements are diverse, wherein the holographic anti-counterfeiting technology is the most common anti-counterfeiting technology at present, for example, security strips with windows of the fifth set of RMB 2005 in China except for 1 yuan, and important certificates such as ID cards, driving licenses and passports in China.

With the increasingly popularization of diffraction optical image technology, the technology is also widely applied in the civil packaging industry, for example, the packaging of cigarettes, wine, medicine and the like, and even labels of textiles and toys use this technology. This also makes the anti-counterfeiting performance of the technology worse and worse.

With the adoption of Motion security strips in the new version of US dollar bills, the anti-counterfeiting industry has shown a strong interest in this novel micro lens array technology, which is an anti-counterfeiting technology with a dynamic feature or a depth-of-field effect generated on the basis of a Moore amplification effect of a micro lens array on a micro graphic-text array, that is, the micro lens array samples and synthesizes the micro graphic-text array to form an image. This technology requires that a micro graphic-text area and a micro graphic-text background area have a sufficient color or brightness contrast. The patent document CN200680062431.9 discloses a manufacturing method of micro graphic-text in an ink scraping mode, in which an undulating structure layer with an icon recessed structure is formed at first, then radiation-cured ink of a certain thickness is coated as a whole, ink outside the recessed structure is scraped off by using an ink scraper afterwards, and finally radiation curing is performed on the radiation-cured ink inside the recessed structure by using a certain dosage of radiation source. The difficulty of the method is that it is difficult to completely scrape off the ink in the micro graphic-text background area by using the ink scraper, and in particular, for a large-width film roll (for example, with a width of 1 m), the transverse uniformity is more difficult to control. Meanwhile, by means of the method, only the manufacturing of micro graphic-text with a specific color is able to be realized, but the manufacturing of micro graphic-text for presenting different color features along with the change in an observation angle cannot be realized. The patent document US20030179364 discloses the manufacturing of black micro graphic-text by using a micro-structure with a high depth-to-width ratio. The method is simple in process and high in implementation feasibility, but is worse in color effect, and is incapable of manufacturing high-brightness and high-saturation colored graphic-text and color-changing micro graphic-text.

Therefore, there is a need for a method for manufacturing a high-contrast and high-chroma micro graphic-text array with high efficiency.

SUMMARY

In order to solve the above technical problems, an objective of the disclosure is to provide an optical anti-counterfeiting element and a manufacturing method thereof, and an anti-counterfeiting product.

In some embodiments of the disclosure, an optical anti-counterfeiting element is provided. The optical anti-counterfeiting element includes: a micro lens array layer, having a micro lens array; and a micro graphic-text array layer, the micro graphic-text array layer includes a micro graphic-text area and a micro graphic-text background area; a surface undulation shape of the micro graphic-text area and a surface undulation shape of the micro graphic-text background area are different; and/or a height of the micro graphic-text area and a height of the micro graphic-text background area are different. Therefore, observing from one side of the micro lens array layer, the micro lens array is able to sample and synthesize the micro graphic-text array layer, so as to form a graphic-text area and a graphic-text background area with different visual features.

In some embodiments of the disclosure, the different visual features refer to that: one of the graphic-text area and the graphic-text background area has a color change feature depending on an observation angle, and the other does not have the color change feature depending on the observation angle; or the graphic-text area and the graphic-text background area have different color change features depending on the observation angle.

In some embodiments of the disclosure, cross sections of the surface undulation shape of the micro graphic-text area and the surface undulation shape of the micro graphic-text background area are at least one of a flat structure, a rectangle, a zigzag shape and a sinusoidal shape.

In some embodiments of the disclosure, at least one of the surface undulation shape of the micro graphic-text area and the surface undulation shape of the micro graphic-text background area is the flat structure.

In some embodiments of the disclosure, a height difference between the micro graphic-text area and the micro graphic-text background area ranges from 50 nm to 600 nm.

In some embodiments of the disclosure, a period of at least one of the micro lens array and the micro graphic-text array ranges from 10 μm to 100 μm.

In some embodiments of the disclosure, a focal length of the micro lens array ranges from 5 μm to 100 μm.

In some embodiments of the disclosure, a minimum value of a line size of the micro graphic-text array is less than 15 μm.

In some embodiments of the disclosure, the micro graphic-text array layer includes a coated optically variable film, and the coated optically variable film includes an absorption layer, a dielectric layer and a reflecting layer, which are stacked in sequence, and the dielectric layer is formed by a wet coating process.

In some embodiments of the disclosure, the micro lens array layer and the micro graphic-text array layer are the same substance coating, that is, the micro lens array layer and the micro graphic-text array layer are made of the same material.

In some embodiments of the disclosure, the optical anti-counterfeiting element further includes: a substrate, the micro lens array layer at least partially covers a first surface of the substrate, and the micro graphic-text array layer at least partially covers a second surface of the substrate.

In some embodiments of the disclosure, an outer side of the optical anti-counterfeiting element further includes a functional coating, which is located on the coated optically variable film, and is configured to achieve a bonding function and/or a protection function.

In some other embodiments of the disclosure an anti-counterfeiting product is also provided, including the optical anti-counterfeiting element mentioned above.

In some embodiments of the disclosure, the anti-counterfeiting product includes one of the following: a logo, a hot stamping wide strip, a sticker and a security strip.

The disclosure further provides a manufacturing method of an optical anti-counterfeiting element, including: forming a multi-layer body including a micro lens array layer and a micro graphic-text array layer, a surface undulation shape of a micro graphic-text area and a surface undulation shape of a micro graphic-text background area are different; and/or a height of the micro graphic-text area and a height of the micro graphic-text background area are different; and forming an absorption layer on the micro graphic-text array layer, forming a dielectric layer on the absorption layer by a wet coating process, and forming a reflecting layer on the dielectric layer. By sampling and synthesizing the micro graphic-text array of the micro graphic-text array layer by using the micro lens array of the micro lens array layer, it is able to be observed that the graphic-text area and the graphic-text background area have different visual features.

In some embodiments of the disclosure, the manufacturing method further includes: after the dielectric layer forms a film by the wet coating process, the dielectric layer is hot pressed on a flat metal plate.

By means of the above technical solutions, the disclosure mainly provides an optical anti-counterfeiting element, the optical anti-counterfeiting element is at least provided with the micro lens array layer and the micro graphic-text array layer (optionally including the substrate), and surface undulation shapes of the micro graphic-text area and the micro graphic-text background area are different, or the height difference is set for the micro graphic-text area and the micro graphic-text background area, so that the graphic-text area and/or the graphic-text background area imaged by the micro lens array layer and the micro graphic-text array layer under sampling synthesis have different visual features. In particular, with a change in an observation angle, a graphic-text and/or a graphic-text background changes from one color to another color, thereby improving an anti-counterfeiting capability.

Other features and advantages of the embodiments of the disclosure will be described in detail in the following detailed description.

BRIEF DESCRIPTION OF THE DRAWINGS

The drawings are used for providing a further understanding of the embodiments of the disclosure, constitute a part of the specification, and are used for explaining the embodiments of the disclosure together with the following detailed description, but do not constitute limitations to the embodiments of the disclosure. In the drawings:

FIG. 4 is a cross-sectional view of an optical anti-counterfeiting element according to Embodiment 3 of the disclosure; and FIG. 5 is a flow chart of a manufacturing method of an optical anti-counterfeiting element according to Embodiment 4 of the disclosure.

Figure 1:
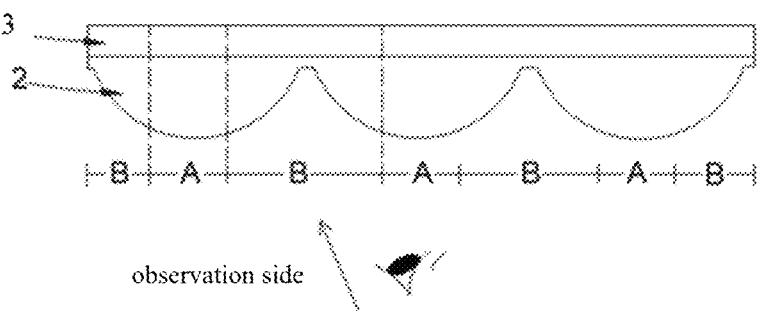
FIG. 1 is a cross-sectional view of a partial structure of an optical anti-counterfeiting element according to Embodiment 1 of the disclosure.

| Description of Reference Signs: | |
|---|---|
| 1. a substrate; | 2. a micro lens array layer; |
| 3. a micro graphic-text array layer; | 4. a coated optically variable film; |
| 41. an absorption layer; | 42. a dielectric layer; |
| 43. a reflecting layer; | 5. a functional coating. |

DETAILED DESCRIPTION OF THE EMBODIMENTS

In the following description, specific details such as specific system structures and technologies are proposed for the purpose of illustration rather than limitation, in order to fully understand the embodiments of the disclosure. However, those skilled in the art should be aware that the disclosure may also be implemented in other embodiments without these specific details. In other cases, detailed descriptions of well-known systems, apparatuses, circuits and methods are omitted to avoid unnecessary details hindering the description of the disclosure.

Specific embodiments of the disclosure will be described below in detail in combination with the drawings. It should be understood that the specific embodiments described herein are merely configured to illustrate and explain the embodiments of the disclosure, rather than limit the embodiments of the disclosure.

In addition, the descriptions of "first", "second" and the like involved in the disclosure are only configured for descriptive purposes, and cannot be understood as indicating or implying their relative importance or implicitly indicating the number of indicated technical features. Thus, the features defined with "first" and "second" may explicitly or implicitly include at least one of the features. In addition, the meaning of "and/or" appearing in the entire text includes three parallel solutions, taking "A and/or B" as an example, including a solution A, or a solution B, or a solution satisfying both A and B. In addition, the technical solutions between various embodiments are able to be combined with each other, but must satisfy the premise that those ordinary skilled in the art is able to implement these combinations, and when the combinations of the technical solutions are contradictory or cannot be implemented, it should be considered that the combinations of the technical solutions do not exist, nor are within the protection scope of the disclosure.

In order to enable those skilled in the art to better understand the technical solutions of the disclosure, an optical anti-counterfeiting element and a manufacturing process thereof according to the disclosure will be described in detail in combination with the drawings.

The embodiments of the disclosure mainly relates to an optical anti-counterfeiting element, and in particular to an optical anti-counterfeiting element based on a micro lens array technology, which aims to achieve an effect of realizing high-contrast and high-chroma graphic-text on the optical anti-counterfeiting element. Specifically, a graphic-text and/or a graphic-text background on the optical anti-counterfeiting element changes from one color to another color along with a change in a manual observation angle, thereby improving a counterfeiting difficulty, and thus further improving an anti-counterfeiting capability.

Figure 2:
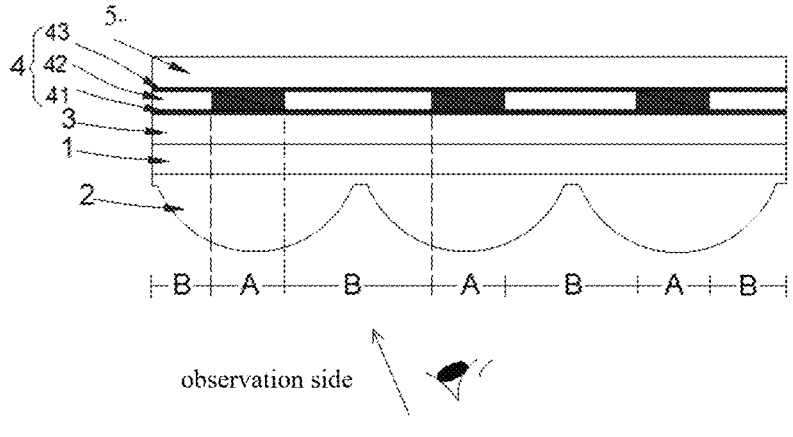
FIG. 2 is a cross-sectional view of an optical anti-counterfeiting element according to Embodiment 1 of the disclosure.

Please refer to FIG. 1 and FIG. 2, FIG. 1 is a cross-sectional view of a partial structure of an optical anti-counterfeiting element according to Embodiment 1 of the disclosure. FIG. 2 is an entire cross-sectional view of another optical anti-counterfeiting element according to Embodiment 1 of the disclosure. (For clearer illustration, some fine features in FIGS. 1-4 in the disclosure are thickened to facilitate a clearer example, but the illustration does not limit the actual size or proportion).

In the embodiments of the disclosure, an optical anti-counterfeiting element includes a micro lens array layer 2 and a micro graphic-text array layer 3, and a user observes from one side of the micro lens array layer 2 to the micro graphic-text array layer 3, so as to achieve an anti-counterfeiting effect by means of the preset micro graphic-text array layer 3.

Please still refer to FIG. 2, in another embodiment of the disclosure, a substrate 1 (also referred to as a base film) is further arranged between the micro lens array layer 2 and the micro graphic-text array layer 3, and the substrate 1 has a first surface and a second surface, which are opposite to each other; the micro lens array layer 2 is located on the first surface of the substrate; and the micro graphic-text array layer 3 is located on the second surface of the substrate.

It can be understood that, the terms "micro lens array layer" and "micro graphic-text array layer" provided above are illustrated, the micro lens array (MLA) is an array consisting of lenses, which have micron-level light-transmitting apertures and micron-level relief depths. Like a traditional lens, a minimum functional unit of the micro lens array layer 2 in the embodiment is also a spherical lens, an aspheric lens, a cylindrical lens and a prism, and is also able to achieve the functions of focusing, imaging, beam transformation and the like at a micro optical angle, moreover, since the unit is small in size and high in integration level, it is able to constitute many novel optical systems to complete functions that a traditional optical element cannot complete. The micro graphic-text array layer 3 is a layer formed by a graphic-text array.

Further, the micro graphic-text array layer 3 includes a micro graphic-text area A and a micro graphic-text background area B. A surface undulation shape of the micro graphic-text area A and a surface undulation shape of the micro graphic-text background area B are different; and/or a height difference is set for the micro graphic-text area A and the micro graphic-text background area B.

It can be understood that, by means of the above two manners, a graphic-text area and/or a graphic-text background area imaged by the micro lens array layer 2 and the micro graphic-text array layer 3 under sampling synthesis have different visual features.

Specifically, observing from one side of the micro lens array layer 2, that is, observing in a direction from the micro lens array layer 2 to the micro graphic-text array layer 3, the micro lens array layer 2 samples and synthesizes the micro graphic-text array layer 3 to form an graphic-text visible to human eyes.

The above-mentioned term "different visual features" refers to that: one of the graphic-text area and the graphic-text background area has a color change feature depending on an observation angle, and the other does not have the color change feature depending on the observation angle; or the graphic-text area and the graphic-text background area have different color change features depending on the observation angle.

It should be understood by those skilled in the art that, the micro graphic-text area A and the micro graphic-text background area B mentioned in the embodiments of the disclosure are distinguished by human definition, and a replacement of the micro graphic-text area A and the micro graphic-text background area B should also fall within the protection scope of the embodiments of the disclosure.

Further, the term "height difference" mentioned above refers to a minimum value of a vertical distance between a point located in the micro graphic-text area and a point located in the micro graphic-text background area on a surface of the micro graphic-text array layer.

Further, the micro graphic-text array layer 3 includes the micro graphic-text area A and the micro graphic-text background area B, and the micro graphic-text array layer 3 correspondingly has a sinusoidal grating structure in the micro graphic-text area A, and the micro graphic-text array layer 3 correspondingly has a flat structure in the micro graphic-text background area B.

Various features of the optical anti-counterfeiting element are described above, and are set forth below through specific embodiments.

Embodiment 1

Please still refer to FIG. 2, FIG. 2 is a cross-sectional view of an optical anti-counterfeiting element in another form according to Embodiment 1 of the disclosure. (For clearer illustration, some fine features in FIGS. 1-4 in the disclosure are thickened for merely exemplary uses, and the illustration does not limit the actual size or proportion).

The optical anti-counterfeiting element according to the embodiment of the disclosure includes: a substrate 1, having a first surface and a second surface, which are opposite to each other; a micro lens array layer 2 is located on the first surface of the substrate 1; and a micro graphic-text array layer 3 is located on the second surface of the substrate 1; and the micro graphic-text array layer 3 includes a micro graphic-text area A and a micro graphic-text background area B.

A surface undulation shape of the micro graphic-text area A and a surface undulation shape of the micro graphic-text background area B are different; and/or a height difference is set for the micro graphic-text area A and the micro graphic-text background area B.

It can be understood that, by means of the above two manners, a graphic-text area and/or a graphic-text background area imaged by the micro lens array layer 2 and the micro graphic-text array layer 3 under sampling synthesis have different visual features.

Specifically, observing from one side of the micro lens array layer 2, that is, observing in a direction from the micro lens array layer 2 to the micro graphic-text array layer 3, the micro lens array layer 2 samples and synthesizes the micro graphic-text array layer 3 to form an graphic-text visible to human eyes.

The above-mentioned term "different visual features" refers to that: one of the graphic-text area and the graphic-text background area has a color change feature depending on an observation angle, and the other does not have the color change feature depending on the observation angle; or the graphic-text area and the graphic-text background area have different color change features depending on the observation angle.

It should be understood by those skilled in the art that, the micro graphic-text area A and the micro graphic-text background area B mentioned in the embodiment of the disclosure are distinguished by human definition, and a replacement of the micro graphic-text area A and the micro graphic-text background area B should also fall within the protection scope of the embodiments of the disclosure.

Further, the term "height difference" mentioned above refers to a minimum value of a vertical distance between a point located in the micro graphic-text area and a point located in the micro graphic-text background area on a surface of the micro graphic-text array layer.

The micro graphic-text array layer 3 includes the micro graphic-text area A and the micro graphic-text background area B, and the micro graphic-text array layer 3 correspondingly has a sinusoidal grating structure in the micro graphic-text area A, and the micro graphic-text array layer 3 correspondingly has a flat structure in the micro graphic-text background area B.

The optical anti-counterfeiting element further includes a coated optically variable film 4 located on the micro graphic-text array layer 3, and the coated optically variable film 4 includes an absorption layer 41, a dielectric layer 42 and a reflecting layer 43, which are stacked in sequence, wherein the dielectric layer 42 is formed by a wet coating process.

The optical anti-counterfeiting element further includes a functional coating 5, having a protection function and/or a bonding function, which is specifically determined according to a use environment of the optical anti-counterfeiting element.

In the embodiment of the disclosure, the micro lens array layer 2 and the micro graphic-text array layer 3 are the same substance coating, so as to facilitate uniform manufacturing to save processes.

In some embodiments, the micro graphic-text array layer 3 has different surface undulation shapes in the micro graphic-text area A and the micro graphic-text background area B, for example, a cross section of an surface undulation shape of the micro graphic-text array layer 3 in the micro graphic-text area A and the micro graphic-text background area B is selected from a flat structure, a rectangle, a zigzag shape, a sinusoidal shape, or a combination of the above shapes. In an embodiment, one of the cross sections of surface undulation shapes of the micro graphic-text array layer 3 in the micro graphic-text area A and the micro graphic-text background area B is a flat structure and the other is not the flat structure. Therefore, one of the graphic-text area and/or the graphic-text background area imaged by the micro lens array layer 2 and the micro graphic-text array layer 3 under sampling synthesis presents a optically variable effect, and the other does not present the optically variable effect or presents a different optically variable effect, thereby improving an anti-counterfeiting effect and improving an anti-counterfeiting capability.

In some other embodiments, the micro graphic-text array layer 3 has a non-zero height difference between the micro graphic-text area A and the micro graphic-text background area B, and the cross section of the surface undulation shape of the micro graphic-text array layer 3 in the two areas is selected from the flat structure, the rectangle, the zigzag shape, the sinusoidal shape, or the combination of the above shapes. In an embodiment, both of the cross sections of the surface undulation shapes of the micro graphic-text array layer 3 in the two areas are flat structures but the micro graphic-text array layer 3 has a height difference.

In an embodiment, the height difference ranges from 50 nm to 600 nm (including endpoints).

It can be understood that, generally, if the height difference is too small, a color difference between the micro graphic-text area A and the micro graphic-text background area B is not obvious; and if the height difference is too large, at least one of the micro graphic-text area A and the micro graphic-text background area B has no obvious optically variable features. By selecting a suitable amount of the dielectric layer 42 applied, the two imaged areas are able to present different optically variable effects, thereby having an excellent anti-counterfeiting feature.

Therefore, it should be understood by those skilled in the art that, a specific selection of the height difference is determined according to adapted product requirements, and a specified numerical value in the height difference is set forth by the following specific embodiments.

All features of the optical anti-counterfeiting element in the embodiment of the disclosure are described above, and various features of the optical anti-counterfeiting element are specifically described below.

In the embodiment of the disclosure, the micro lens array in the micro lens array layer 2 is a non-periodic array, a periodic array, a local periodic array or any combination thereof, and each of the non-periodic array, the periodic array and the local periodic array includes a plurality of micro lens units, Meanwhile, a micro lens unit is a refractive micro lens, a diffractive micro lens, or a combination thereof. The refractive micro lens is selected from a spherical micro lens, a parabolic micro lens, an ellipsoidal micro lens, a cylindrical micro lens, or other geometric optical-based micro lens of any shape or any combination thereof, and the diffractive micro lens is selected from a harmonic diffractive micro lens, a planar diffractive micro lens or a Fresnel zone plate.

In an embodiment, in order to manufacture the optical anti-counterfeiting element of the disclosure into a suitable thin film shape with a smaller thickness, a period of the micro lens array and/or a period of the micro graphic-text array ranges from 10 μm to 100 μm. In an embodiment, a focal length of the micro lens array ranges from 5 μm to 100 μm. In an embodiment, in order to obtain a better optical effect, a minimum value of the line size of the micro graphic-text array is less than 15 μm, more specifically, is less than 8 μm.

It can be understood that, the term "period of the micro lens array" mentioned above refers to an interval between each micro lens of the micro lens array, and the term "period of the micro graphic-text array" refers to an interval between each graphic-text area or graphic-text background area in the micro graphic-text array.

In the embodiment of the disclosure, depending on that a material with deformation property is selected by the micro lens array layer 2 and the micro graphic-text array layer 3, that is, the micro lens array layer 2 and the micro graphic-text array layer 3 are able to be deformed under a certain temperature and pressure to form a required undulation structure. The micro lens array layer 2 and the micro graphic-text array layer 3 are selected from a thermoplastic material, and are also selected from a radiation-cured material. In the embodiment, the micro lens array layer 2 and the micro graphic-text array layer 3 are selected from the radiation-cured material.

Further, in the embodiment of the disclosure, thicknesses (folded in a flat area) of the micro lens array layer 2 and the micro graphic-text array layer 3 are generally 1 μm to 10 μm (including endpoints).

Further, the micro lens array layer 2 and the micro graphic-text array layer 3 are the same substance coating without boundary, or are different coatings, that is, the substrate 1 is arranged between the micro lens array layer 2 and the micro graphic-text array layer 3. The former has the advantages that the anti-counterfeiting element is thinner, and thus is able to be conveniently applied into a protected main product, thereby saving space and improving process aesthetic feeling, and the latter has the advantages that the micro lens array layer 2 and the micro graphic-text array layer 3 are simultaneously processed on two sides of the substrate 1, such that a structure of the anti-counterfeiting element is relatively more stable, thereby facilitating the production.

In the embodiment of the disclosure, a material of the absorption layer 41 is a metal such as Al, Cu, Ni, Cr, Ag, Fe, Sn, Au, Pt, or a mixture or an alloy thereof. It should be understood by those skilled in the art that, nickel or chromium still has very high chemical stability in a very thin state and has a very low cost, therefore, nickel or chromium is selected. The absorption layer 41 is formed by a vapor deposition method, for example, including but not limited to, thermal evaporation, magnetron sputtering, and the like. A thickness of the absorption layer 41 is generally thinner, and is typically less than 10 nm. Therefore, a surface topography of the absorption layer 41 is consistent with a surface topography of the micro graphic-text array layer 3.

A primary resin in a raw material before wet coating (i.e., the wet coating process) of the dielectric layer 42 is polyurethane, acrylic acid, polyester, or a combination thereof. As an interference optically variable area, the flatter a surface of the dielectric layer 42 is, the more conducive to the formation of an effective Fabry-Perot interference cavity is. Thus, the raw material of the dielectric layer 42 before wet coating should have a very low viscosity, for example, less than 20 cps, which enables better leveling on the reflecting layer. For most resins, a refractive index is in the vicinity of 1.5.

In an embodiment, in order to obtain a good optically variable effect, a thickness of a dry film of the dielectric layer 42 should range from 200 nm to 800 nm. A specific thickness thereof should be determined according to the required color.

In order to further ensure a smoother surface of the dielectric layer 42, after the dielectric layer 42 forms a film by wet coating, the dielectric layer 42 is hot pressed on a flat metal plate. A coated optically variable film formed by the dielectric layer 42 which has been hot pressed has stronger reflection and higher color saturation.

The reflecting layer 43 is a high-reflection metal coating to achieve a strong reflection effect, and is a single-layer metal coating, or a multi-layer metal coating, or a multi-metal mixed coating. A material of the reflecting layer 43 is a metal such as Al, Cu, Ni, Cr, Ag, Fe, Sn, Au, Pt, or a mixture or an alloy thereof. In an embodiment, since aluminum is low in cost and high in brightness, aluminum is selected. The reflecting layer 43 is formed on the dielectric layer by a vapor deposition method, for example, including but not limited to, thermal evaporation, magnetron sputtering, and the like. A thickness of the reflecting layer 43 is generally greater than 10 nm and less than 80 nm, more specifically, is greater than 20 nm to 50 nm. If the reflecting layer 43 is too thin, a brightness is insufficient; and if the reflecting layer 43 is too thick, a fastness to the dielectric layer is poor, and a cost is increased. The reflecting layer 43 is formed on the dielectric layer 42 in a manner of homomorphic covering or substantially homomorphic covering.

The optical anti-counterfeiting element further includes a functional coating 5, and the functional coating 5 is a hot melt adhesive layer only having a bonding function, so as to be conveniently bonded into the protected main product, and/or is an other functional coating such as a protective layer, so as to prevent a optically variable layer from being damaged by surrounding physical or chemical environment in use, and the functional coating 5 is also a combination of the two layers, which are both within the protection scope of the embodiments of the disclosure.

In the embodiment of the disclosure, the substrate 1 is an at least partially transparent dielectric thin film, which is formed of a thin film material having good physical and chemical resistance and high mechanical strength. In an embodiment, the substrate 1 is a polyethylene terephthalate (PET) thin film. The micro lens array layer 2 is selected from a spherical refractive micro lens array. In the embodiment of the disclosure, the graphic-text area has no optically variable effect.

In an embodiment, in order to conveniently manufacture the optical anti-counterfeiting element, there is no height difference between the micro graphic-text area A and the micro graphic-text background area B.

The dielectric layer 42 is a substance layer that isolates the absorption layer 41 from the reflecting layer 43. In the embodiment of the disclosure, the dielectric layer 42 of the coated optically variable film 4 is formed by the wet coating process. It should be understood by those skilled in the art that, the coated optically variable film 4, as an optical thin film, is able to be formed by a dry method and a wet method production process. In the embodiment of the disclosure, the wet coating process is selected, and an implementable mode is that: mixing components with expected functions into a liquid coating, coating the liquid coating on the micro graphic-text array layer 3 in different processing manners, and then drying and curing the liquid coating. Specifically, in the embodiment of the disclosure, the wet coating process refers to a process of applying liquid varnish to a substrate and then drying and curing the liquid varnish to form a film, which is relative to the vapor deposition process (or referred to as an evaporation process). A surface undulation shape of a thin film layer formed by vapor deposition is generally the same as or substantially the same as a surface undulation shape of the substrate.

Further, the wet coating process includes at least one of gravure coating, spray coating, dip coating, spin coating, gravure printing, flexographic printing, silk-screen printing and relief printing. With regard to the wet coating process, since the used raw material is liquid with fluidity, the surface undulation shape after a dry film is formed is obliviously different from the surface undulation shape of the substrate in general other than the flat structure. A surface of the thin film formed by the wet coating process tends to be flat compared with a surface of the substrate. However, in the embodiment of the disclosure, the wet coating process specifically used by the coated optically variable film 4 is not specifically defined, as long as corresponding process effects are satisfied.

Further, a substance of the absorption layer 41 and the reflecting layer 43 is at least one of Al, Cu, Sn, Ti, Cr, Ni, Au and Ag. It can be understood that the reflecting layer, as a bright inorganic coating, is configured to improve an intensification, and the absorption layer is able to improve a light efficiency and enhance a definition.

It should be understood by those skilled in the art that, the absorption layer 41 and the reflecting layer 43 are arranged in parallel, and the dielectric layer 42 (or referred to as a spacer layer) is located therebetween. The absorption layer 41, the reflecting layer 43 and the dielectric layer 42 constitute a basic unit of a Fabro interference optically variable coating. Observing in a direction from one side of the absorption layer 41 to the reflecting layer 43, the optical anti-counterfeiting element presents an optical color change feature depending on the observation angle, which is referred to as an optically variable feature for short.

The absorption layer 41 and the reflecting layer 43 are also able to be arranged in a non-parallel manner, at this time, a Fabro interference is weakened, and the optical anti-counterfeiting element does not present the optically variable feature or presents a weaker optically variable feature. The absorption layer 41 and the reflecting layer 43 of the optical anti-counterfeiting element are generally formed by the vapor deposition process. An optically variable coating thin film of the dielectric layer 42 is formed on a basis of the vapor deposition process, and is referred to as an evaporation optically variable film. Since a thickness of the dielectric layer 42 formed by the vapor deposition process is uniform, a color feature of the evaporation optically variable film almost does not depend on an undulation state of the substrate. An optically variable thin film of the dielectric layer 42 is formed on a basis of the wet coating process, that is, the coated optically variable film 4. If being formed on a flat structure, the coated optically variable film 4 presents a stronger optically variable feature, and if being formed on a zigzag grating, a sinusoidal grating and other majority of irregular gratings, the coated optically variable film 4 does not present the optically variable feature or presents a weaker optically variable feature since the thickness of the dielectric layer 42 is not uniform. If being formed on a regular grating structure including a plurality of platforms on a cross section, for example, a rectangular grating structure or a trapezoidal grating structure, the entirety of the coated optically variable film 4 still presents a relatively good optically variable feature. The optically variable feature of the coated optically variable film 4 is a comprehensive result of the optically variable features presented by various platform areas.

In summary, the Embodiment 1 of the disclosure mainly provides an optical anti-counterfeiting element, the optical anti-counterfeiting element is at least provided with the micro lens array layer and the micro graphic-text array layer (optionally including the substrate), and surface undulation shapes of the micro graphic-text area and the micro graphic-text background area are different; or the height difference is set for the micro graphic-text area and the micro graphic-text background area, so that the graphic-text area and/or the graphic-text background area imaged by the micro lens array layer (2) and the micro graphic-text array layer (3) under sampling synthesis have different visual features, and in particular, with the change in the observation angle, the graphic-text and/or the graphic-text background changes from one color to another color, thereby improving the anti-counterfeiting capability.

The optical anti-counterfeiting element is manufactured into a form of an identifier, a hot stamping wide strip, a sticker and a security strip, and then is bonded into the protected main product.

The present solution is set forth below by specific embodiments.

Embodiment 2

Figure 3:
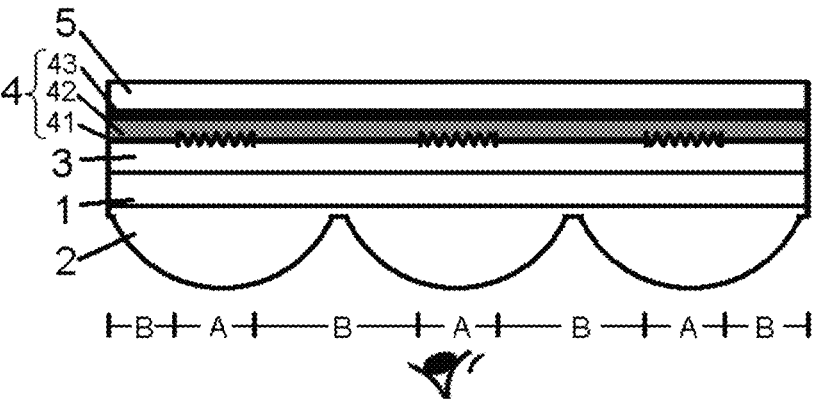
FIG. 3 is a cross-sectional view of an optical anti-counterfeiting element according to Embodiment 2 of the disclosure.

Please refer to FIG. 3, FIG. 3 is a cross-sectional view of an optical anti-counterfeiting element according to Embodiment 2 of the disclosure. The optical anti-counterfeiting element includes:

a substrate 1, having a first surface and a second surface, which are opposite to each other;

a micro lens array layer 2, located on the first surface of the substrate 1; and a micro graphic-text array layer 3, located on the second surface of the substrate 1, the micro graphic-text array layer 3 includes a micro graphic-text area A and a micro graphic-text background area B, the micro graphic-text array layer 3 correspondingly has a sinusoidal grating structure in the micro graphic-text area A, and the micro graphic-text array layer 3 correspondingly has a flat structure in the micro graphic-text background area B;

a coated optically variable film 4 located on the micro graphic-text array layer 3, the coated optically variable film 4 includes an absorption layer 41, a dielectric layer 42 and a reflecting layer 43, which are stacked in sequence, and the dielectric layer 42 is formed by a wet coating process; and a functional coating 5, having a protection function and/or a bonding function, which is specifically determined according to a use environment of the optical anti-counterfeiting element.

It can be understood that, the sinusoidal grating structure is arranged on the micro graphic-text array layer 3 corresponding to the micro graphic-text area A and the flat structure is arranged the micro graphic-text array layer 3 on corresponding to the micro graphic-text background area B, such that the micro graphic-text area A and the micro graphic-text background area B have different surface undulation shapes. Observing from the micro lens array layer 2 to one side of the micro graphic-text array layer 3, under an action of the sinusoidal grating structure arranged on the micro graphic-text array layer 3, a macroscopic graphic-text area and a macroscopic background area, which are subjected to Moore amplification, are seen. The corresponding graphic-text area has a rainbow holographic effect (a non-optically variable effect), and the corresponding background area has an optically variable effect, so that the optical anti-counterfeiting element has a strong visual expressive force and a good anti-counterfeiting effect.

The dielectric layer 42 is a substance layer that isolates the absorption layer 41 from the reflecting layer 43. In the embodiment of the disclosure, the dielectric layer 42 of the coated optically variable film 4 is formed by the wet coating process. It should be understood by those skilled in the art that, the coated optically variable film 4, as an optical thin film, is able to be formed by a dry method and a wet method production process. In the embodiment of the disclosure, the wet coating process is selected, and an implementable mode is that: mixing components with expected functions into a liquid coating, coating the liquid coating on the micro graphic-text array layer 3 in different processing manners, and then drying and curing the liquid coating.

Further, the wet coating process includes at least one of gravure coating, spray coating, dip coating, spin coating, gravure printing, flexographic printing, silk-screen printing and relief printing. In the embodiment of the disclosure, the wet coating process specifically used by the coated optically variable film 4 is not specifically defined, as long as corresponding process effects are satisfied.

Further, a substance of the absorption layer 41 and the reflecting layer 43 is at least one of Al, Cu, Sn, Ti, Cr, Ni, Au and Ag. It can be understood that the reflecting layer, as a bright inorganic coating, is configured to improve an intensification, and the absorption layer is able to improve a light efficiency and enhance a definition.

In the embodiment of the disclosure, the micro lens array layer 2 and the micro graphic-text array layer 3 are the same substance coating, so as to facilitate uniform manufacturing to save processes.

In the embodiment of the disclosure, the substrate 1 is an at least partially transparent dielectric thin film, which is formed of a thin film material having good physical and chemical resistance and high mechanical strength. In an embodiment, the substrate 1 is a polyethylene terephthalate (PET) thin film. The micro lens array layer 2 is selected from a spherical refractive micro lens array. In the embodiment of the disclosure, the graphic-text area has no optically variable effect.

In the embodiment, in order to conveniently manufacture the optical anti-counterfeiting element, there is no height difference between the micro graphic-text area A and the micro graphic-text background area B.

Embodiment 3

Please referring to FIG. 4, FIG. 4 is a cross-sectional view of an optical anti-counterfeiting element according to Embodiment 3 of the disclosure, and as shown in FIG. 4, another optical anti-counterfeiting element according to the embodiment of the disclosure includes:

a substrate 1, having a first surface and a second surface, which are opposite to each other;

a micro lens array layer 2, located on the first surface of the substrate 1; and a micro graphic-text array layer 3, located on the second surface of the substrate 1, the micro graphic-text array layer 3 includes a micro graphic-text area A and a micro graphic-text background area B, the micro graphic-text array layer 3 has a flat structure in both the micro graphic-text area A and the micro graphic-text background area B, and has a non-zero height difference;

a coated optically variable film 4, the coated optically variable film 4 includes an absorption layer 41, a dielectric layer 42 and a reflecting layer 43, which are stacked in sequence, and the dielectric layer 42 is formed by a wet coating process; and a functional coating 5, having a protection function and/or a bonding function.

Observing from one side of the micro lens array layer 2, a macroscopic graphic-text area and a macroscopic background area, which are subjected to Moore amplification, are seen, and the two areas have different optically variable effects, and thus have a strong visual expressive force and a good anti-counterfeiting effect.

To achieve obviously different optically variable effects of the graphic-text area and the graphic-text background area, it is necessary to select a suitable height difference of the micro graphic-text array layer 3 between the micro graphic-text area A and the micro graphic-text background area B, and a suitable amount of the dielectric layer 42 applied. For example, in the embodiment, the dielectric layer 42 is a polyurethane coating with a refractive index of 1.5, a thickness of the micro graphic-text array layer 3 in the micro graphic-text area A is 500 nm, and the thickness of the micro graphic-text array layer 3 in the micro graphic-text background area B is 370 nm (i.e., the height difference of the micro graphic-text array layer 3 in the micro graphic-text area A and the micro graphic-text background area B is 130 nm), then the graphic-text area presents an optically variable effect of changing from green to magenta, and the graphic-text background area presents an optically variable effect of changing from golden to green.

The optical anti-counterfeiting element according to the disclosure is particularly suitable for being manufactured into a security strip with windows. Anti-counterfeiting paper with the security strip with windows is configured for the anti-counterfeiting of various high-safety products such as banknotes, passports, securities and the like. The optical anti-counterfeiting element of the disclosure is able to be transferred or bonded onto carriers in the form of an identifier, a hot stamping wide strip, a sticker, a security strip, and the like. These carriers are high-safety products such as banknotes, securities, credit cards, passports and the like, and are also high-added-value commodities.

Embodiment 4

The disclosure further provides a manufacturing method of an optical anti-counterfeiting element. Please refer to FIG. 5, FIG. 5 is a flow chart of a manufacturing method of an optical anti-counterfeiting element provided according to Embodiment 4 of the disclosure, and the manufacturing method includes:

step S1: forming a multi-layer body including a micro lens array layer and a micro graphic-text array layer, a surface undulation shape of a micro graphic-text area and a surface undulation shape of a micro graphic-text background area are different; and/or a height of the micro graphic-text area and a height of the micro graphic-text background area are different; and step S2: forming an absorption layer on the micro graphic-text array layer, forming a dielectric layer on the absorption layer by a wet coating process, and forming a reflecting layer on the dielectric layer.

It can be understood that the steps of the method are able to be obviously technically motivated by the foregoing Embodiments 1-4, and thus no repeated description will be given in the embodiment of the disclosure.

Further, the manufacturing method further includes:

after the dielectric layer forms a film by the wet coating process, the dielectric layer is hot pressed on a flat metal plate.

It can be understood that, due to characteristics of the material selected by the optical anti-counterfeiting element, after the dielectric layer forms the film by the wet coating process, the dielectric layer is hot pressed on the flat metal plate, so as to cure the dielectric layer to form a product.

The embodiment of the disclosure further provides an anti-counterfeiting product, including the above optical anti-counterfeiting element, and the optical anti-counterfeiting element is transferred or bonded onto an anti-counterfeiting product in the form of an identifier, a hot stamping wide strip, a sticker, a security strip and the like, so as to achieve an anti-counterfeiting effect.

It should also be noted that, the terms "include" "contain" or any other variants thereof are intended to cover non-exclusive inclusions, such that a process, a method, a commodity or a device including a series of elements not only includes those elements, but also includes other elements that are not explicitly listed, or also includes elements inherent to such a process, method, commodity or device. If there are no more restrictions, the element defined by the sentence "including a . . . " does not exclude the existence of other identical elements in the process, the method, the commodity or the device that includes the element.

The above descriptions are only embodiments of the disclosure, and are not intended to limit the disclosure. For those skilled in the art, the disclosure is able to have various modifications and changes. Any modifications, equivalent replacements, improvements and the like, made within the spirit and principles of the disclosure, shall all be included in the scope of the claims of the disclosure.

What is claimed is:

1. An optical anti-counterfeiting element, wherein the optical anti-counterfeiting element comprises:

a micro lens array layer, having a micro lens array; and a micro graphic-text array layer;

the micro graphic-text array layer comprises a micro graphic-text area and a micro graphic-text background area;

a surface undulation shape of the micro graphic-text area and a surface undulation shape of the micro graphic-text background area are different, and a height of the micro graphic-text area and a height of the micro graphic-text background area are different; or the surface undulation shape of the micro graphic-text area and the surface undulation shape of the micro graphic-text background area are different; or the height of the micro graphic-text area and the height of the micro graphic-text background area are different; and observing from one side of the micro lens array layer, the micro lens array samples and synthesizes the micro graphic-text array layer, so as to form a graphic-text area and a graphic-text background area with different visual features; and a coated optically variable film located on the micro graphic-text array layer, the coated optically variable film comprises an absorption layer, a dielectric layer and a reflecting layer, which are stacked from a surface of the micro graphic-text array layer in sequence, and the dielectric layer is formed by a wet coating process.

2. The optical anti-counterfeiting element according to claim 1, wherein the different visual features refer to that:

one of the graphic-text area and the graphic-text background area has a color change feature depending on an observation angle, and the other does not have the color change feature depending on the observation angle; or the graphic-text area and the graphic-text background area have different color change features depending on the observation angle.

3. The optical anti-counterfeiting element according to claim 2, wherein cross sections of the surface undulation shape of the micro graphic-text area and the surface undulation shape of the micro graphic-text background area are at least one of a flat structure, a rectangle, a zigzag shape and a sinusoidal shape.

4. The optical anti-counterfeiting element according to claim 3, wherein at least one of the surface undulation shape of the micro graphic-text area and the surface undulation shape of the micro graphic-text background area is the flat structure.

5. The optical anti-counterfeiting element according to claim 1, wherein a height difference between the micro graphic-text area and the micro graphic-text background area ranges from 50 nm to 600 nm.

6. The optical anti-counterfeiting element according to claim 1, wherein a period of at least one of the micro lens array and the micro graphic-text array ranges from 10 μm to 100 μm.

7. The optical anti-counterfeiting element according to claim 6, wherein a focal length of the micro lens array ranges from 5 μm to 100 μm.

8. The optical anti-counterfeiting element according to claim 1, wherein a minimum value of a line size of the micro graphic-text array is less than 15 μm.

9. The optical anti-counterfeiting element according to claim 1, wherein undulation shapes of two side faces of the dielectric layer are different.

10. The optical anti-counterfeiting element according to claim 1, wherein the micro lens array layer and the micro graphic-text array layer are made of the same material.

11. The optical anti-counterfeiting element according to claim 1, wherein the optical anti-counterfeiting element further comprises:

a substrate, comprising a first surface and a second surface;

the micro lens array layer at least partially covers the first surface, and the micro graphic-text array layer at least partially covers the second surface.

12. The optical anti-counterfeiting element according to claim 1, wherein the optical anti-counterfeiting element further comprises:

a functional coating, which is located on the coated optically variable film, and is configured to achieve a bonding function and/or a protection function.

13. An anti-counterfeiting product, comprising the optical anti-counterfeiting element according to claim 1.

14. The anti-counterfeiting product according to claim 13, wherein the anti-counterfeiting product comprises one of the following:

a logo, a hot stamping wide strip, a sticker and a security strip.

15. A manufacturing method of an optical anti-counterfeiting element according to claim 1, comprising:

forming a multi-layer body comprising a micro lens array layer and a micro graphic-text array layer, a surface undulation shape of a micro graphic-text area of the micro graphic-text array layer and a surface undulation shape of a micro graphic-text background area of the micro graphic-text array layer are different; and/or a height of the micro graphic-text area and a height of the micro graphic-text background area are different; and forming an absorption layer on the micro graphic-text array layer, forming a dielectric layer on the absorption layer by a wet coating process, and forming a reflecting layer on the dielectric layer.

16. The manufacturing method of an optical anti-counterfeiting element according to claim 15, wherein the manufacturing method further comprises:

after the dielectric layer forms a film by the wet coating process, the dielectric layer is hot pressed on a flat metal plate.

\* \* \* \* \*